United States Patent
Liu et al.

(10) Patent No.: US 8,184,335 B2
(45) Date of Patent: May 22, 2012

(54) METHOD FOR AD-HOC PARALLEL PROCESSING IN A DISTRIBUTED ENVIRONMENT

(75) Inventors: Hua Liu, Webster, NY (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1043 days.

(21) Appl. No.: 12/054,720

(22) Filed: Mar. 25, 2008

(65) Prior Publication Data

US 2009/0249029 A1 Oct. 1, 2009

(51) Int. Cl.
*G06K 1/00* (2006.01)
*G06F 15/16* (2006.01)

(52) U.S. Cl. ...... 358/1.9; 358/1.12; 358/1.13; 358/1.15; 358/1.16; 358/1.17; 358/426.04; 358/426.06; 358/426.11; 358/426.12; 715/740; 715/252; 715/253; 715/242; 715/234; 709/201; 709/202; 709/203; 709/214; 709/215; 709/220; 709/221; 709/222; 709/223; 709/224; 709/226; 709/229; 718/1; 718/102; 718/105; 708/173; 708/230; 708/685; 382/162; 382/164; 382/167; 382/175; 382/176; 382/177; 382/178; 382/180; 382/303; 382/317

(58) Field of Classification Search ................ 358/1.15, 358/1.13, 1.12, 1.14, 1.16, 1.17, 426.04, 358/426.06, 426.11, 426.12; 382/304; 715/740, 715/262, 253, 242, 234; 712/28; 708/173, 708/230, 685; 709/201, 202, 203, 214, 215, 709/220–226, 229
See application file for complete search history.

(56) References Cited

U.S. PATENT DOCUMENTS

| | | | | |
|---|---|---|---|---|
| 5,930,511 | A | * | 7/1999 | Hinsley ...................... 717/164 |
| 6,369,910 | B1 | * | 4/2002 | Mitani ......................... 358/1.17 |
| 6,449,650 | B1 | * | 9/2002 | Westfall et al. .............. 709/228 |
| 6,742,161 | B1 | * | 5/2004 | James et al. .................. 715/205 |
| 7,161,705 | B2 | * | 1/2007 | Klassen ........................ 358/1.18 |
| 7,385,714 | B2 | * | 6/2008 | Christiansen ............... 358/1.13 |
| 7,720,993 | B2 | * | 5/2010 | Liu et al. ...................... 709/238 |
| 2004/0136028 | A1 | | 7/2004 | Rabb |
| 2004/0196496 | A1 | | 10/2004 | Klassen |
| 2006/0072148 | A1 | | 4/2006 | Kovnat et al. |

\* cited by examiner

*Primary Examiner* — Steven Kau

(74) *Attorney, Agent, or Firm* — Michael J. Nickerson; Basch & Nickerson LLP

(57) ABSTRACT

An overall processing time to rasterize, at the first device, the electronic document to be rendered is computed. Also, a rendering time to render, at the first device, the electronic document to be rendered is computed. When the overall processing time to rasterize at the first device is greater than the rendering time to render at the first device, the electronic document to be rendered is parsed into a first document and sub-documents. A productivity capacity of each node is determined, the productivity capacity being a measured of the processing power of the node and the communication cost of exchanging information between the first device and the node. A sub-document is rasterized at a node when a productivity capacity of the node reduces the processing time to rasterize the electronic document to be rendered to be less than the computed overall processing time. The rasterized first document and each rasterized sub-document are aggregated to create a rasterized electronic document to be rendered at the first device.

20 Claims, 11 Drawing Sheets

METHOD FOR AD-HOC PARALLEL PROCESSING IN A DISTRIBUTED ENVIRONMENT

BACKGROUND

Digital multifunction reprographic systems have grown in sophistication and function. In addition, digital multifunction reprographic systems are often used in environments where several identical or similar machines are present, all of which are connected via some sort of high speed/high bandwidth network. Since some of the jobs that may be submitted to such a machine require extensive computation, it is desirable that a machine can distribute large computing tasks to other cooperating machines on its network. Such sharing can expedite the processing of large or complex tasks.

To provide a job sharing capability, how a job should be partitioned between the processing components should be determined. Conventional approaches use fixed partitioning schemes or consider computational capabilities. However, these conventional approaches do not consider the communication properties of the network.

As noted above, a number of office devices may be connected to a network. Conventionally, these devices are largely independent, and the user interacts with a single device. However, there is an opportunity for a collection of such devices to act collaboratively by sharing resources and cooperating to perform a user's task.

An example of such a task might be the ripping of a very large, rich print job. Documents are typically described in a page description language (PDL) format such as PCL, PostScript, or PDF. The PDL provides a series of drawing commands and as part of the printing process these commands must be converted to a raster image. Frequently, it can take longer to do this rasterization than it takes to image the raster pattern on the paper. Thus, the printer may sit in an idle state while the document is being prepared.

To improve the productivity of the printer, a conventional system has been developed that consists of an array of processors and software to separate the print job into pages and to farm the pages out to various processors for parallel rasterization. However, this is a specialized (and expensive) piece of hardware, and would not be appropriate for occasional use in the office environment.

Therefore, it is desirable to provide a system enables a sharing of resources without relying upon expensive hardware.

Moreover, it is desirable to provide a system where the document is separated into pages that are then farmed out to neighboring multi-functional devices for parallel rasterization.

BRIEF DESCRIPTION OF THE DRAWING

The drawings are only for purposes of illustrating various embodiments and are not to be construed as limiting, wherein.

DETAILED DESCRIPTION

Figure 1:
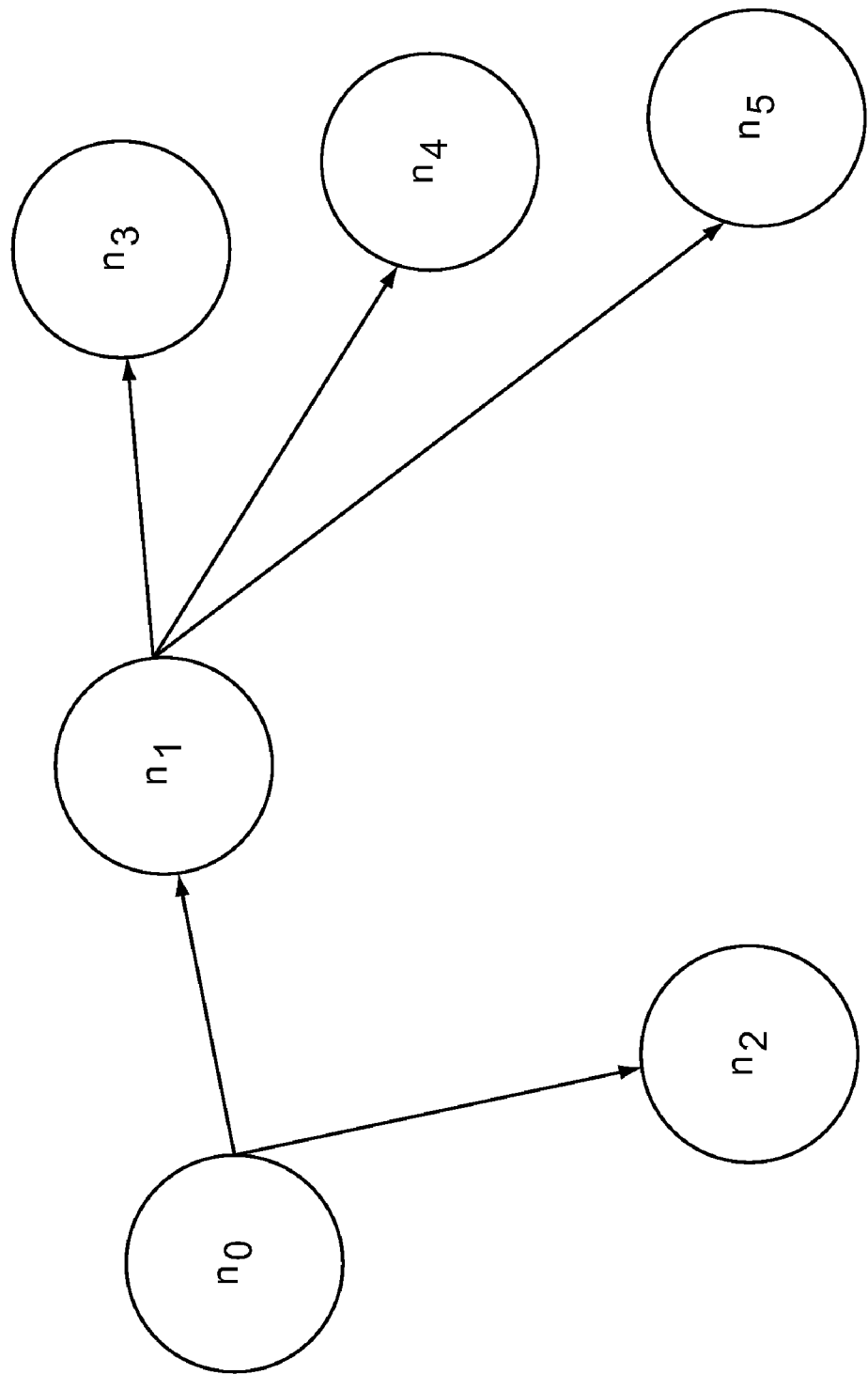
FIG. 1 illustrates an example of a spanning tree.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As noted above, it is desirable to provide a system where the document is separated into pages that are then farmed out to neighboring multi-functional devices for parallel rasterization.

The rasterized results could then be compressed and sent back to the printing device for imaging. In this scenario, the system would need to decide which of the available neighboring machine should be used, and how many pages each machine should be given. The ideal partitioning could consider productivity of the candidate machines, but that productivity depends not only on the processing power of the device, but also upon the communication costs in interacting with the device.

It is noted that rasterization and rendering of a document is only one of a number of possible functions that a multifunction device might perform. For example, a multifunction device might scan a document and apply optical character recognition techniques to discover the text that the page images contain. Here again, the scanned document could be partitioned into pages that could be distributed to candidate machines in order to conduct the optical character recognition processing in parallel. The device handling would include the disposition of the optical character recognition results. Other types of processing such as format conversion or translations are also candidates for parallel processing.

In general, the disposition of the document by the devices is referred to as the actions carried out by the device such as rendering or storing the document. Thus, the time to render or store a document is generally referred to as the disposition time to dispose of the document. Also, the work needed to prepare the document for disposition (such as rasterization or optical character recognition) is generally referred to as the processing carried out on the document. Thus, the time to rasterize a document or to optically recognize the characters in the document is generally referred to as the processing time to process the document.

In other words, candidates for parallel processing are jobs with actions that are not easily distributed. It is noted that one does not usually distribute the rendering of a job because a user typically desires to retrieve a single correlated document at the device. Moreover, it is noted that one does not usually distribute the storing of a document since a user typically desires a single coherent document to be stored.

In the description given below, the system includes a number of computing networks with a variety of computational devices including a number of digital reprographic machines.

Each digital reprographic machine may comprise several different components including, for example, printing, scanning, and document storage. Each digital reprographic machine has associated with it a computing resource, usually some sort of microprocessor based computer that includes hardware and software components that can handle the various digital reprographic machine functions.

These functions can include: network communications, conversion of page description language (PDL) descriptions of documents into print format digital images, conversion of scanned image documents into a variety of formats, and others. There are also other devices on the network besides the digital reprographic machines including a variety of computer resources which may include, among other things, both servers and workstations. A user at a workstation may choose to access the resources available on the network, in particular, those associated with the digital reprographic machines.

In the following discussion a process will be described wherein the processing of a printing job, submitted by a workstation in PDL form to one of the digital reprographic machines, can be shared between several of the machines on the network.

A network may include a variety of devices. For example, it might include a computer workstation, a file or computation server, as well as a number of digital reprographic machines. The exact topography of the network is not relevant as long as the devices can communicate with each other. The devices may have different rates of information transmission or communication overhead. In such a system, a large, divisible job (such as a large document that can be processed in pieces) is submitted to node $n_0$, which decides to split the large document into a number of smaller pieces and sends the smaller pieces to other nodes for parallel processing.

Traditional approaches assume homogeneous nodes and/or negligible communication overhead; however, node and network personalities should be taken into consideration, namely, node computation capabilities and communication overheads. Further, traditional parallel processing approaches assume that data domain is located at all the nodes and consequently there is no distribution cost. This assumption is not valid in document processing in office environment, in which a document is typically submitted to only one machine. As a result, distribution cost has to be taken into consideration.

To facilitate the distribution of the large document, node $n_0$ has to decide which among the n nodes (including itself) are to be selected to parallel process the large document. An example of this determination is as follows.

Node $n_0$ sends a message to each of the n−1 nodes asking about the nodes' computation capabilities. These messages are sent simultaneously. Messages are associated with a current time stamp, lifetime $t_{lifetime}$, a sender ID list, and an addressee ID list of nodes from the set of n candidate nodes that are not on the sender list. Expired messages will be discarded by receiver nodes.

When a node receives the first query message, it immediately sends a feedback message to the sender and ignores following query messages from other senders. It also forwards to the members of the addressee list the query message with a new time stamp, its own ID removed from the addressee list and appended to the sender list. The process continues until the addressee list is empty or it is not worth splitting jobs represented by $$\delta < \frac{\lambda \mu_1}{(1+\alpha)\mu_0^2 \mu_1 + \lambda \mu_0(\mu_0 + \mu_1)}.$$

Then, a spanning tree, as illustrated in FIG. 1, is constructed from the links corresponding to the first messages that first reached the node. This criterion determines the depth of the spanning tree.

The example illustrated in FIG. 1 shows a spanning tree where n=6. Node $n_0$ begins the process by sending messages to nodes $n_1$ through $n_5$. When these addressee nodes receive the message, the addressee nodes forward the message. So when node $n_1$ receives the message, node $n_1$ forwards it to nodes $n_2$ through $n_5$.

Suppose that in this example, the communication between node $n_0$ and nodes $n_3$ through $n_5$ is slow. Although $n_0$ sends message to $n_3$, $n_3$ receives message from $n_1$ first, and as a result $n_3$ becomes direct child of $n_1$. In this example, FIG. 1 illustrates the same relationship nodes $n_4$ and $n_5$.

When the termination condition is met, the nodes will stop propagating the query messages. Then a spanning tree will be constructed where the route from $n_i$ to $n_j$ represents the fastest path between the two nodes.

To calculate the capabilities of each node, each leaf node, a leaf node being a node at the end of a span or branch of the spanning tree, reports the leaf node's computation capability and the communication overhead to its direct parent node. As shown in FIG. 1, $n_3$, $n_4$, and $n_5$ report to $n_1$, and $n_2$ reports to $n_0$. After intermediate nodes ($n_1$ in this example) collects all the response messages from its children nodes ($n_3, n_4$, and $n_5$ in this example), it sequences these nodes based on their reported computation capabilities and decides the number of children nodes using formula $F_1$ or $F_2$, as set forth below. This criterion determines the width of the spanning tree.

$$\left. \begin{array}{l} Speedup(n) = \dfrac{\mu_0 \mu_1 + \lambda \mu_0 + (\alpha \mu_0 + \lambda)\sum_{i=1}^{n-1} s_i \mu_i}{(\delta \mu_0^2 \mu_1 + \lambda \delta \mu_0^2 + \lambda \mu_0 + \mu_0 \mu_1) + (\alpha \mu_0 + \delta \alpha \mu_0^2 + \lambda \delta \mu_0)\sum_{i=1}^{n-1} s_i \mu_i} > threshold_s \\[2ex] Efficiency(n) = \dfrac{1}{n} \times \dfrac{\mu_0 \mu_1 + \lambda \mu_0 + (\alpha \mu_0 + \lambda)\sum_{i=1}^{n-1} s_i \mu_i}{(\delta \mu_0^2 \mu_1 + \lambda \delta \mu_0^2 + \lambda \mu_0 + \mu_0 \mu_1) + (\alpha \mu_0 + \delta \alpha \mu_0^2 + \lambda \delta \mu_0)\sum_{i=1}^{n-1} s_i \mu_i} > threshold_e \end{array} \right\} F_1$$

$$\left. \begin{array}{l} Speedup(n) = \dfrac{(1+\alpha)\mu_1 + \lambda \sum_{i=0}^{n-1} s_i \mu_i}{[(1+\alpha)\delta \mu_0 \mu_1 + \lambda + \mu_1 - \alpha \mu_0] + (\lambda \delta + \alpha)\sum_{i=0}^{n-1} s_i \mu_i} > threshold_s \\[2ex] Efficiency(n) = \dfrac{1}{n} \times \dfrac{(1+\alpha)\mu_1 + \lambda \sum_{i=0}^{n-1} s_i \mu_i}{[(1+\alpha)\delta \mu_0 \mu_1 + \lambda + \mu_1 - \alpha \mu_0] + (\lambda \delta + \alpha)\sum_{i=0}^{n-1} s_i \mu_i} > threshold_e \end{array} \right\} F_2$$

Here for simplicity of the formula, the nodes have been relabeled such that the intermediate node is now node 0, and its direct children nodes have IDs as 1, 2, ..., and m. $\lambda_i$ is the communication overhead between node 0 and i; $\mu_i$ is the processing speed of node i; $\alpha$ is the ratio of document size after process compared to original document size.

Every intermediate node calculates and reports $\mu_{group}$ to its direct parent node using formula $F_3$ or $F_4$, until $n_0$ receives all the responses from its direct children nodes ($n_1$ and $n_2$ in this example).

$$\mu_{g_n} = \frac{1}{\left(\frac{1}{\gamma_d} + \frac{1}{\gamma_d}\right) + \frac{\lambda + \mu_1 + \alpha \sum_{i=1}^{n-1} s_i \mu_i}{\mu_0 \mu_1 + \lambda \mu_0 + (\alpha \mu_0 + \lambda) \sum_{i=1}^{n-1} s_i \mu_i}} \quad F_3$$

$$\mu_{g_n} = \frac{1}{\left(\frac{1}{\gamma_d} + \frac{1}{\gamma_c}\right) + \frac{\lambda + \mu_1 - \alpha \mu_0 + \alpha \sum_{i=0}^{n-1} s_i \mu_i}{(1+\alpha)\mu_0 \mu_1 + \lambda \sum_{i=0}^{n-1} s_i \mu_i}} \quad F_4$$

Node $n_0$ partitions the document based on the computation capabilities and communication overhead of its direct children nodes ($n_1$ and $n_2$) and itself. If a child node branches to additional nodes as does node $n_1$ in the example, then the computation capability of its child node is actually the group capability of a sub tree rooted from the child node, for example the capability reported by node $n_1$ is the cumulated capability of the sub tree with node $n_1$ as the root. Then node $n_0$ sends the partitioned sub documents to its direct children nodes proportion to their capabilities.

After an intermediate node receives the sub documents, it further partitions it, and sends the further partitioned sub documents to its direct children nodes. After all the partitioned sub documents are sent out, the intermediate node can start processing the sub document assigned to itself while its direct children nodes are partitioning and distributing sub documents. Consequently, the partition and distribution is carried out on all the intermediate nodes in parallel.

After nodes finish processing the sub documents, the nodes send processed sub documents back to their direct parent node for aggregation. Similar to partitioning and distribution, the aggregation is carried out on all the intermediate nodes in parallel. The processed document is finally aggregated on original node ($n_0$ in this example) and returned to the user.

The parallel processing method discussed above can be applied to the type of applications, which can be partitioned into independent sub tasks for parallel processing and merged after processing. However, the physical environment in which an application is executed may require the process to be customized.

Figure 5:
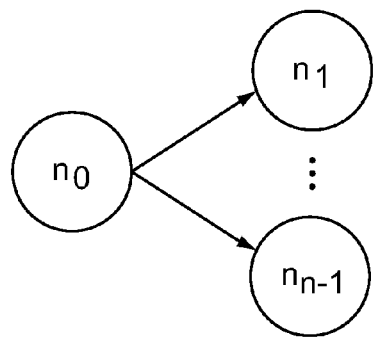
FIG. 5 illustrates an example of a one level tree.

In the one environment (typically a cluster or local area network environment), the communication bandwidth is the same among all the nodes ($\lambda_i = \lambda = 100$ Mbps). In such an environment, all the nodes will become the direct children nodes of node 0. Consequently, a one level tree can be constructed, as illustrated in FIG. 5.

Figure 6:
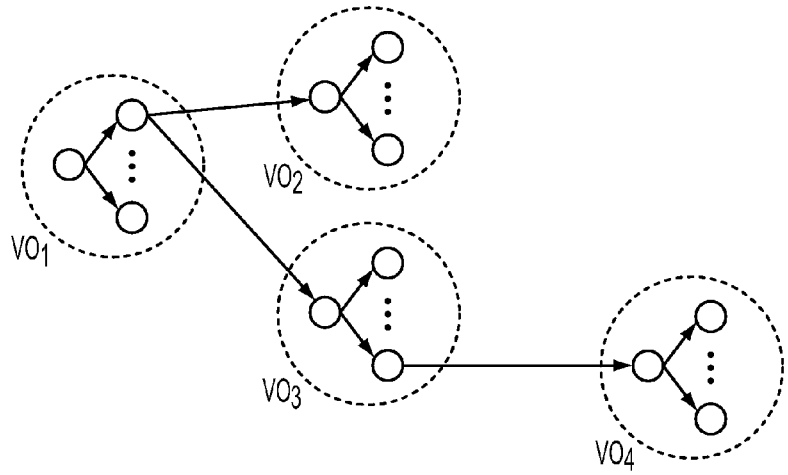
FIG. 6 illustrates an example of a grid environment.

In Grid environments, the communication bandwidth is not uniform. As shown in FIG. 6, bandwidth within one virtual organization is fast while bandwidth across virtual organizations is slower, and consequently one-level trees are constructed within virtual organizations and these trees are connected together in a tree structure according to the bandwidth across virtual organizations.

To accommodate the two environments, for nodes on the $i^{th}$ level of the tree (i is the length of sender list) and i is even, the lifetime of query messages is $$t_{lifetime} = \frac{v_{message}}{\lambda},$$

where $v_{message}$ is the size of the query message and $\lambda$ is the bandwidth within one virtual organization. Then messages sending to nodes in other virtual organizations will be discarded. In this way, a one level tree is constructed within one virtual organization.

For nodes on the $i^{th}$ level of the tree (i is the length of sender list) and i is odd, the lifetime of query messages is set to be a large value, to connect nodes in different virtual organizations.

Figure 7:
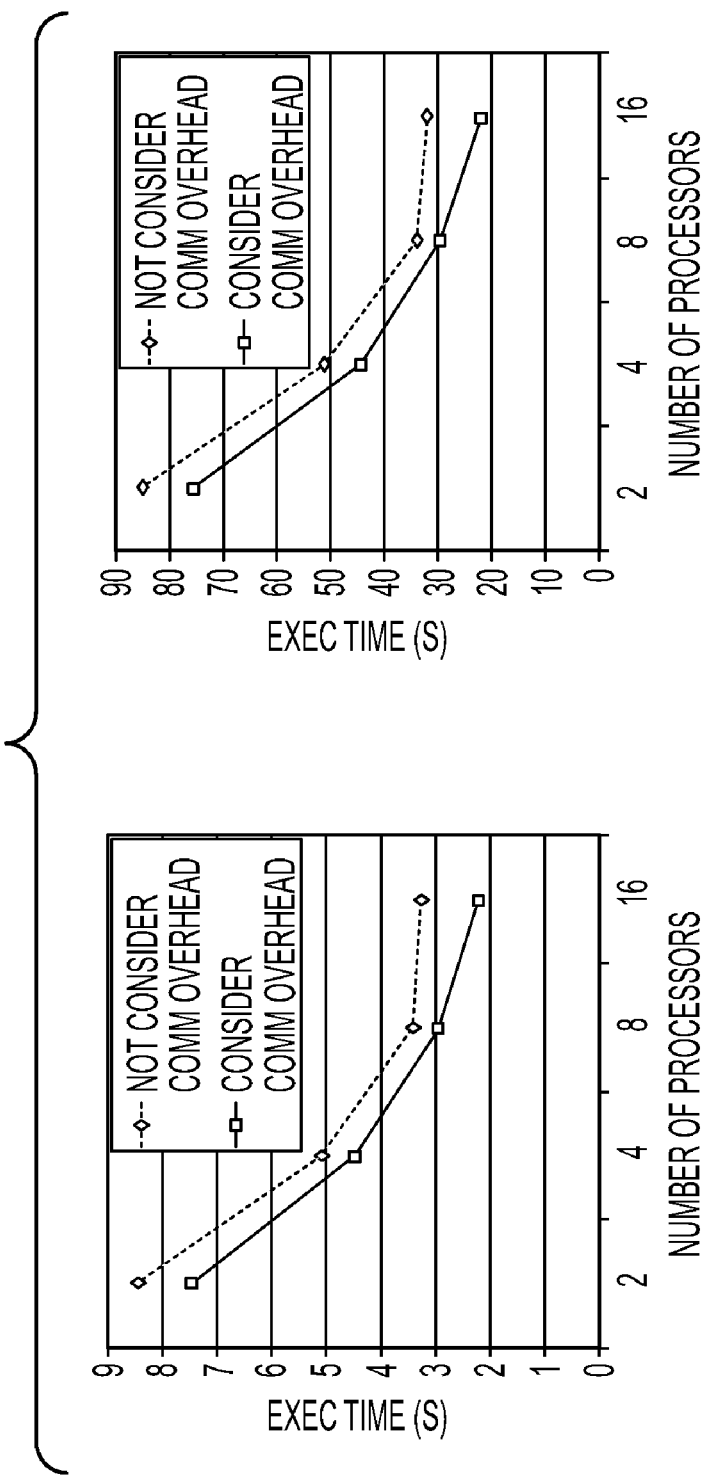
FIG. 7 illustrates a comparison of overall execution time.
Figure 8:
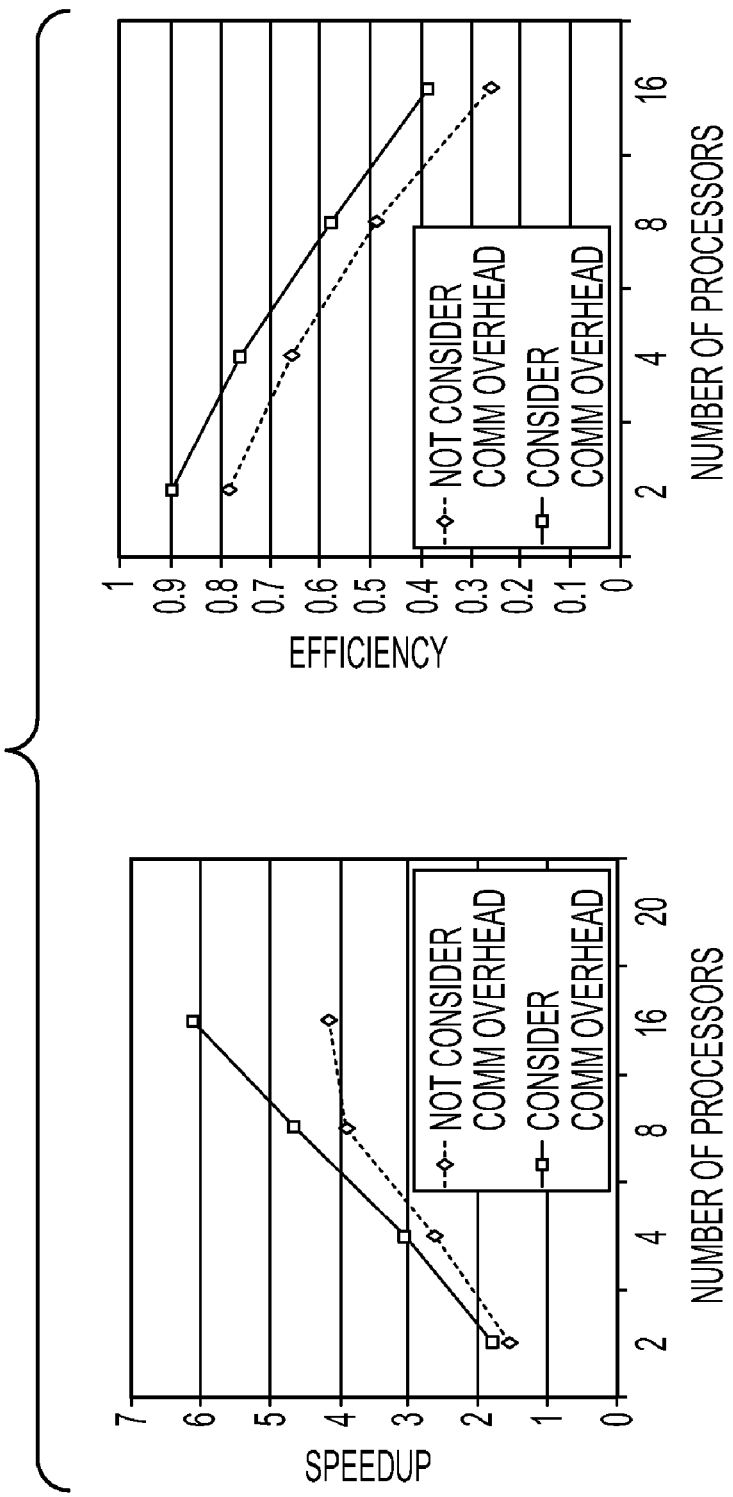
FIG. 8 illustrates a comparison of speedup and efficiency factors.

FIG. 7 compares the overall execution time using the method discussed above with a method not considering communication overhead as the number of nodes involved in parallel processing increases. FIG. 8 compares the speedup and efficiency factors of the two methods.

Figure 9:
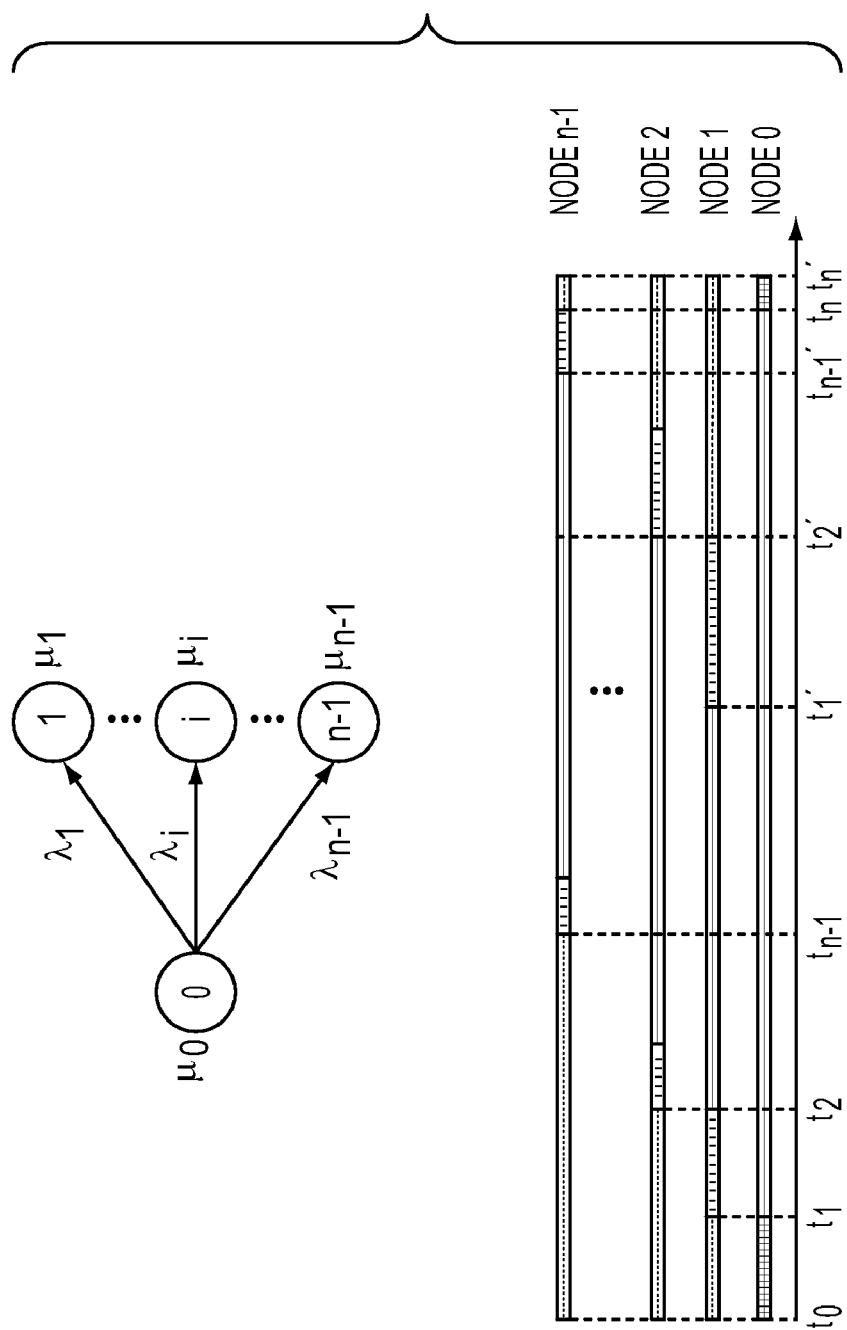
FIG. 9 graphically illustrates an example of a calculation of a group capability of a node.

As shown in FIG. 9, node 0 is going to calculate the group capability of node 0~n-1 based on the individual computation capabilities of node 0~n-1 ($\mu_0$~$\mu_{n-1}$) and the communication overheads ($\lambda_1$~$\lambda_{n-1}$). Nodes 0~n-1 are the children nodes of node 0, and they have similar communication speed ($\lambda_i \approx \lambda$) according to the algorithm. Here $\mu_i (1 \leq i \leq n-1)$ could be group computation capability of a sub tree rooted at node i.

A document of size $v_i$ is assigned to node i, and the size may change to $\alpha v$ after being processed. For example, if a color document of size x bytes (each page is 8.5 by 11) is rasterized and compressed (at compression ratio of 1/10), then its size becomes $$8.5 \times 11 \times 600^2 \times 4 \times \frac{1}{10} \text{bytes.}$$

Then $$\alpha = 8.5 \times 11 \times 600^2 \times 4 \times \frac{\frac{1}{10}}{v_i}$$

in this example.

The divide-parallelize-conquer process is illustrated in FIG. 9. At time $t_0$, node 0 receives the document of size v. At time $t_1$, node 0 finishes partitioning. The partition speed of node 0 is $\gamma_d$ and as a result $t_1 = t_0 + v/\gamma_d$. After partitioning, node 0 starts sending partitioned documents to children nodes 1~n-1 and then processing the portion of document assigned to itself simultaneously.

As illustrated in FIG. 9, the children nodes start to process the sub tasks at time $t_1, t_2, \ldots, t_{n-1}$ and send back processed document to node 0 at time $t_1', t_2', \ldots, t_{n-1}'$. From time $t_2'$ when the first sub document is received, node 0 starts to merge sub documents and the merge speed of node 0 is $\gamma_c$. At time $t_n'$, $n_0$ merges all the sub documents in the original sequence and sends back to its direct parent node.

The above description is represented below, as $E_1$. It is assumed that the time needed for partitioning and merging is proportional to the size of the operated document.

$$T_d = \frac{\sum_{i=0}^{n-1} v_i}{\gamma_d}, \quad T_c = \frac{\alpha \sum_{i=0}^{n-1} v_i}{\gamma_c}, \quad T_{p_n} = \frac{v_0}{\mu_0}$$

$$\mu_{g_n} = \frac{v}{T_{p_n} + T_d + T_c}$$

$$\frac{1}{\lambda}\sum_{j=1}^{i} v_j + \frac{v_i}{\mu_i} + \frac{\alpha}{\lambda}\sum_{j=i}^{n-1} v_j = \frac{v_0}{\mu_0} \quad \text{where } 1 \leq i \leq n-1 \qquad E_1$$

Let $s_i = \dfrac{\prod_{j=1}^{i-1}(\lambda + \alpha\mu_j)}{\prod_{j=2}^{i}(\lambda + \mu_j)}$ where $2 \leq i \leq n-1$ and $s_0 = s_1 = 1$.
Then $$v_i = \frac{s_i \mu_i}{\mu_1} v_1$$

where $1 \leq i \leq n-1$, and $$v_1 = \frac{\lambda \mu_1 v_0}{\mu_0 \left(\lambda + \mu_1 + \alpha \sum_{i=1}^{n-1} s_i \mu_i\right)}$$

$$v = \sum_{i=0}^{n-1} v_i = \frac{v_0}{\mu_0} \times \frac{\lambda\mu_0 + \mu_0\mu_1 + (\lambda + \alpha\mu_0)\sum_{i=1}^{n-1} s_i\mu_i}{\lambda + \mu_1 + \alpha\sum_{i=1}^{n-1} s_i\mu_i}.$$

Consequently, $$T_{p_n} = \frac{\lambda + \mu_1 + \alpha\sum_{i=1}^{n-1} s_i\mu_i}{\mu_0\mu_1 + \lambda\mu_0 + (\alpha\mu_0 + \lambda)\sum_{i=1}^{n-1} s_i\mu_i} \times v$$

where $n \geq 2$, and $$T_{p_1} = \frac{v_0}{\mu_0}.$$

$$\mu_{g_n} = \frac{v}{T_d + T_c + T_{p_n}} = \frac{1}{\left(\frac{1}{\gamma_d} + \frac{1}{\gamma_d}\right) + \dfrac{\lambda + \mu_1 + \alpha\sum_{i=1}^{n-1} s_i\mu_i}{\mu_0\mu_1 + \lambda\mu_0 + (\alpha\mu_0 + \lambda)\sum_{i=1}^{n-1} s_i\mu_i}} \quad \text{where}$$

$n \geq 2$.

According to Amdahl's law, the speedup of parallelism is $$Speedup(n) = \frac{T_1}{T_n}.$$

$$Speedup(2) =$$

$$\frac{T_1}{T_n} = \frac{v}{T_{p_2} + T_d + T_c} = \frac{(1+\alpha)\mu_0\mu_1 + \lambda(\mu_0 + \mu_1)}{\dfrac{T_d + T_c}{v} \times \mu_0 \times [(1+\alpha)\mu_0\mu_1 + \lambda(\mu_0 + \mu_1)] + (1+\alpha)\mu_0\mu_1 + \lambda\mu_0}.$$

Only when $$\frac{T_d + T_c}{v} \times \mu_0 \times [(1+\alpha)\mu_0\mu_1 + \lambda(\mu_0 + \mu_1)] - \lambda\mu_1 < 0,$$

node 0 splits jobs.
Let $$\delta = \frac{T_d + T_c}{v} = \frac{1}{\gamma_d} + \frac{\alpha}{\gamma_c}$$

be the overhead incurred by parallel processing.
When $$\delta < \frac{\lambda\mu_1}{(1+\alpha)\mu_0^2\mu_1 + \lambda\mu_0(\mu_0 + \mu_1)},$$

it is worth splitting.
When node 0 splits, it should decide how many nodes (n) are involved.

$$\Delta T = T_n - T_{n+1} = T_{p_n} - T_{p_{n+1}} = \frac{s_n\mu_n\lambda(\lambda + \mu_1)}{\left[\mu_0\mu_1 + \lambda\mu_0 + (\alpha\mu_0 + \lambda)\sum_{i=1}^{n} s_i\mu_i\right] \times \left[\mu_0\mu_1 + \lambda\mu_0 + (\alpha u_0 + \lambda)\sum_{i=1}^{n-1} s_i\mu_i\right]} > 0$$

Executing a job on n+1 nodes will take less execution time than that on n nodes, where $n \geq 2$.
The speedup parameter is denoted by $$Speedup(n) = \frac{T_1}{T_d + T_c + T_{p_n}} = \frac{\mu_0\mu_1 + \lambda\mu_0 + (\alpha\mu_0 + \lambda)\sum_{i=1}^{n-1} s_i\mu_i}{(\delta\mu_0^2\mu_1 + \lambda\delta\mu_0^2 + \lambda\mu_0 + \mu_0\mu_1) + (\alpha\mu_0 + \delta\alpha\mu_0^2 + \lambda\delta\mu_0)\sum_{i=1}^{n-1} s_i\mu_i}$$

Intuitively, as node 0 splits the job into more pieces, the decreasing rate of overall execution time will slow down and eventually does not have significant changes, evaluated by $$\text{Efficiency}(n) = \frac{\text{Speedup}(n)}{n}.$$

$$\text{Efficiency}(n) = \frac{1}{n} \times \frac{\mu_0\mu_1 + \lambda\mu_0 + (\alpha\mu_0 + \lambda)\sum_{i=1}^{n-1} s_i\mu_i}{(\delta\mu_0^2\mu_1 + \lambda\delta\mu_0^2 + \lambda\mu_0 + \mu_0\mu_1) + (\alpha\mu_0 + \delta\alpha\mu_0^2 + \lambda\delta\mu_0)\sum_{i=1}^{n-1} s_i\mu_i} \text{ where } n \geq 2.$$

According to the algorithm, node 0 adds node i to its children nodes in the sequence of $\mu_i$ decreasing. As a result, the overall execution time saved by adding one more node is becoming less significant. In other words, Efficiency(n) decreases as n increases.

Figure 10:
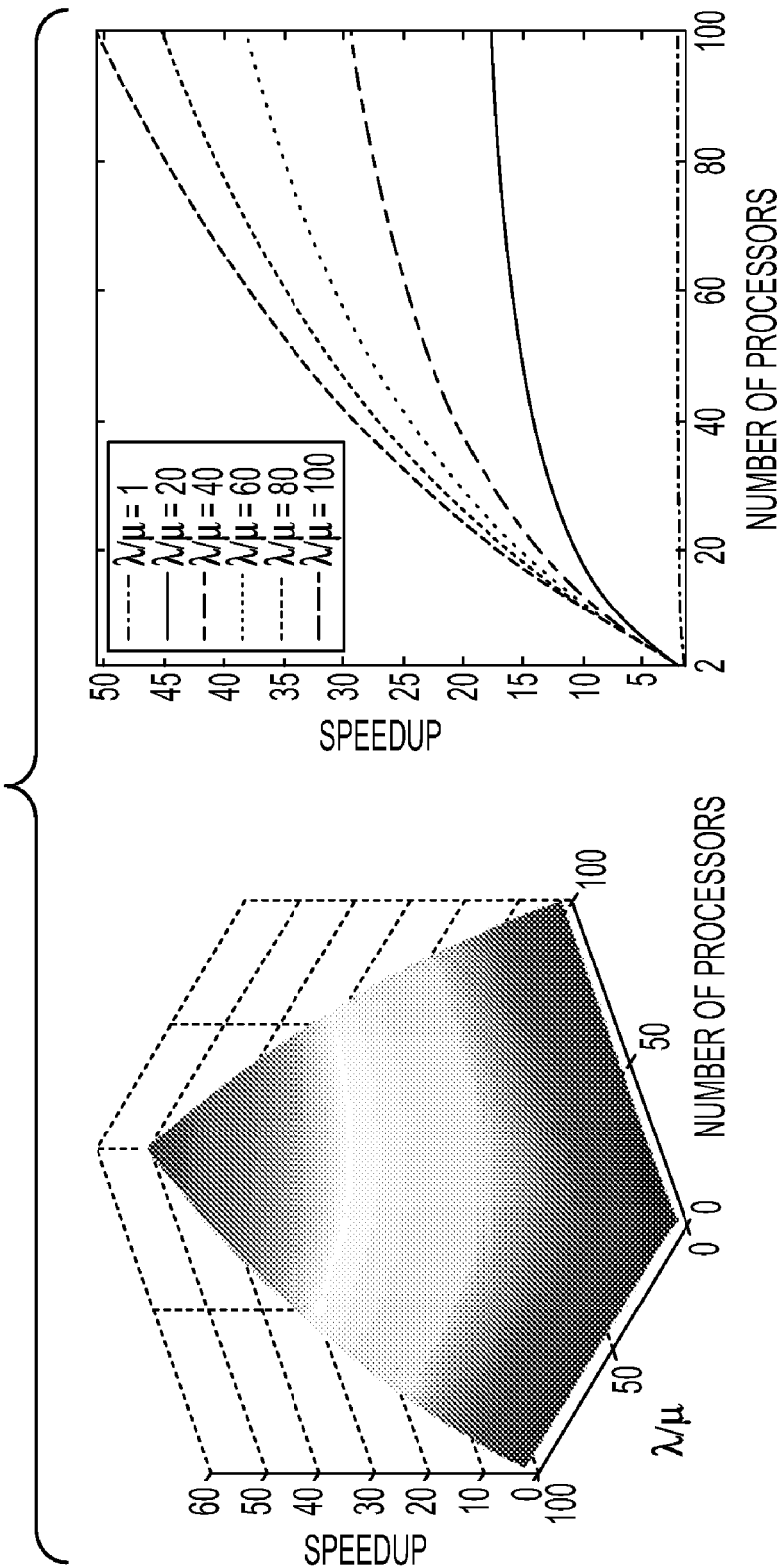
FIG. 10 graphically illustrates a Speedup(n) relationship.
Figure 11:
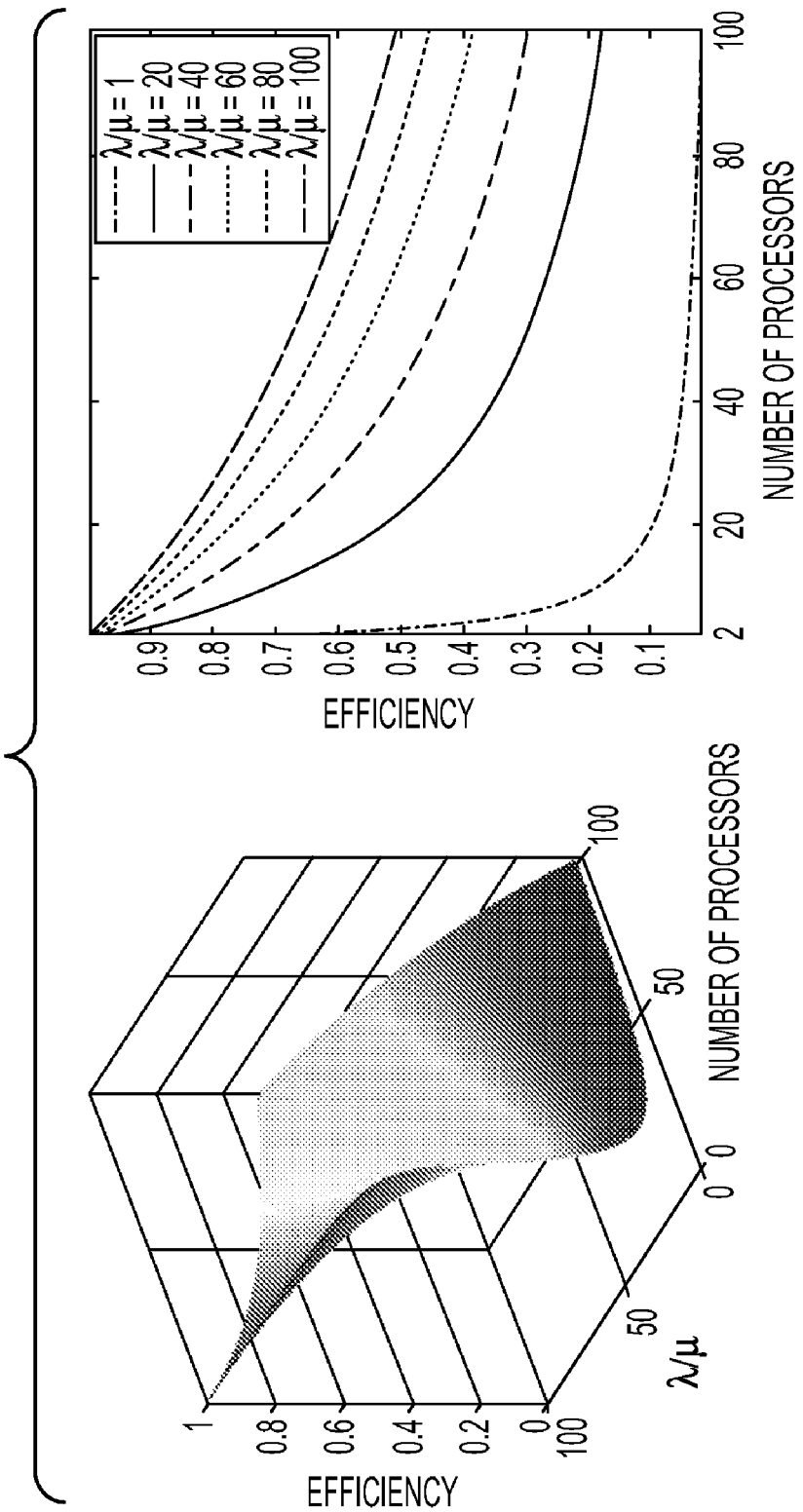
FIG. 11 graphically illustrates an Efficiency(n) relationship.
Figure 12:
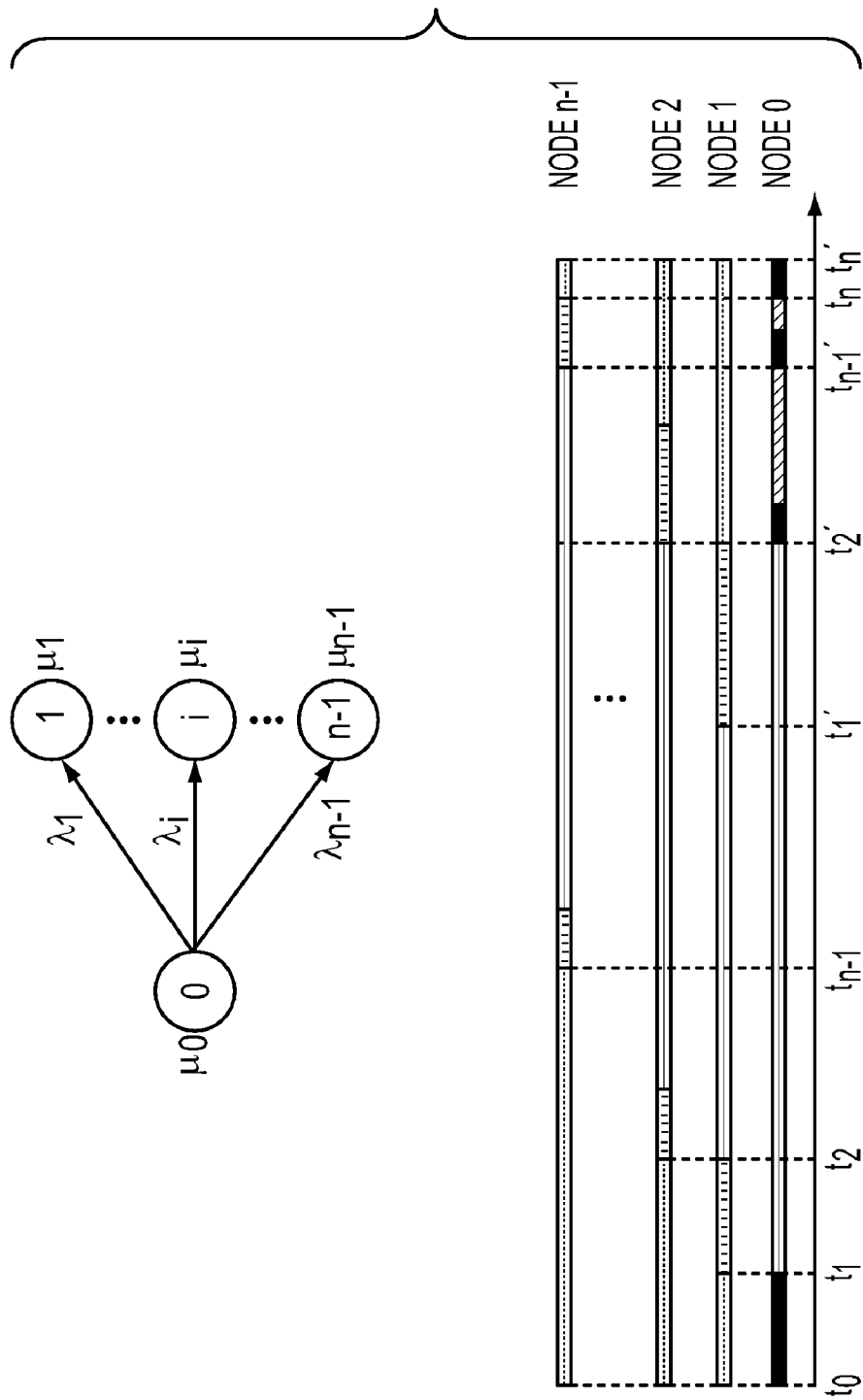
FIG. 12 graphically illustrates another example of a calculation of a group capability of a node.

The relationship of Speedup(n) and Efficiency(n) is plotted in FIGS. 10 and 11, respectively. For simplicity, assume $\alpha=1$ (document size does not change after processing), $\mu_i = \mu$ (all the involved nodes have the same computational capability), $\delta=0$ (the time for dividing and conquering is negligible). Then $$\text{Speedup}(n) = \frac{n\frac{\lambda}{\mu} + n}{\frac{\lambda}{\mu} + n} \text{ and Efficiency}(n) = \frac{\frac{\lambda}{\mu} + 1}{\frac{\lambda}{\mu} + n}.$$

The scalability of a parallel processing method is the ability to maintain parallel processing gain when both problem size and system size increase. The scalability is defined as $$\text{Scalability}(m, n) = \frac{n \times w_m}{m \times w_n} = \frac{T_m(w_m)}{T_n(w_n)},$$

where $w_n$ is the work executed when n processors are employed and $T_n$ is the execution time, $w_m$ is the work executed when m processors are employed and $T_m$ is the execution time. Ideally, if the overall workload and the number of processors involved both scale up m times, the execution time for scaled workload keeps the same as that for the original workload, namely, Scalability(m,n)=1.

Assuming $\mu_i = \mu$ and then the termination conditions are $$\text{Speedup}(n) = \frac{\mu^2 + \lambda\mu + (\alpha\mu^2 + \lambda\mu)\sum_{i=1}^{n-1} s_i}{(\delta\mu^3 + \lambda\delta\mu^2 + \lambda\mu + \mu^2) + (\alpha\mu^2 + \delta\alpha\mu^3 + \lambda\delta\mu^2)\sum_{i=1}^{n-1} s_i} > th_s$$

and $$\text{Efficiency}(n) = \frac{1}{n} \times \frac{\mu^2 + \lambda\mu + (\alpha\mu^2 + \lambda\mu)\sum_{i=1}^{n-1} s_i}{(\delta\mu^3 + \lambda\delta\mu^2 + \lambda\mu + \mu^2) + (\alpha\mu^2 + \delta\alpha\mu^3 + \lambda\delta\mu^2)\sum_{i=1}^{n-1} s_i} > th_e.$$

As a result, the number of processors n is determined independent of workload $w_n$. Therefore, $$\text{Scalability}(m, n) = \frac{w_m}{w} \neq 1 \text{ where } w_m \neq w_n.$$

$$T_d = \frac{\sum_{i=0}^{n-1} v_i}{\gamma_d}, \quad T_c = \frac{\alpha\sum_{i=0}^{n-1} v_i}{\gamma_c}, \quad T_{p_n} = \frac{v_0}{\mu_0} + \frac{\alpha}{\lambda}\sum_{i=2}^{n-1} v_i \quad E_1$$

$$\mu_g = \frac{v}{T_{p_n} + T_c} = \frac{\sum_{i=0}^{n-1} v_i}{T_{p_n} + T_c}$$

$$\frac{v_1}{\lambda}(1 + \alpha) + \frac{v_1}{\mu_1} = \frac{v_0}{\mu_0}$$

$$\left(\frac{1}{\mu_i} + \frac{1}{\lambda}\right) \times v_i = \left(\frac{1}{\mu_{i-1}} + \frac{\alpha}{\lambda}\right) \times v_{i-1} \text{ where } 2 \leq i \leq n-1$$

Let $$s_i = \frac{\prod_{j=1}^{i-1}(\lambda + \alpha\mu_j)}{\prod_{j=2}^{i}(\lambda + \mu_j)}$$

where $2 \leq i \leq n-1$, and $s_0 = s_1 = 1$.

Then $$v_i = \frac{s_i\mu_i}{\mu_1} v_1$$

where $1 \leq i \leq n-1$, $$v = \sum_{i=0}^{n-1} v_i = \frac{v_0}{\mu_0} \times \frac{(1+\alpha)\mu_0\mu_1 + \lambda\sum_{i=0}^{n-1}(s_i\mu_i)}{\lambda + (1+\alpha)\mu_1}.$$

Consequently, $$T_{p_n} = \frac{\lambda + \mu_1 - \alpha\mu_0 + \alpha\sum_{i=0}^{n-1} s_i\mu_i}{(1+\alpha)\mu_0\mu_1 + \lambda\sum_{i=0}^{n-1} s_i\mu_i} \times v$$

where $n \geq 2$, and $$T_{p_1} = \frac{v}{\mu_0} \cdot \mu_{g_n} = \frac{v}{T_d + T_c + T_{p_n}} = \frac{1}{\left(\frac{1}{\gamma_d} + \frac{1}{\gamma_c}\right) + \frac{\lambda + \mu_1 - \alpha\mu_0 + \alpha\sum_{i=0}^{n-1} s_i\mu_i}{(1+\alpha)\mu_0\mu_1 + \lambda\sum_{i=0}^{n-1} s_i\mu_i}}.$$

According to Amdahl's law, the speedup of parallelism is $$Speedup(n) = \frac{T_1}{T_n}.$$

$$Speedup(2) = \frac{T_1}{T_2} = \frac{T_1}{T_{p_2} + T_d + T_c} =$$

$$\frac{(1+\alpha)\mu_0\mu_1 + \lambda(\mu_0 + \mu_1)}{\frac{T_d + T_c}{v} \times \mu_0 \times [(1+\alpha)\mu_0\mu_1 + \lambda(\mu_0 + \mu_1)] + (1+\alpha)\mu_0\mu_1 + \lambda\mu_0}$$

Only when $$\frac{T_d + T_c}{v} \times \mu_0 \times [(1+\alpha)\mu_0\mu_1 + \lambda(\mu_0 + \mu_1)] - \lambda\mu_1 < 0,$$

node 0 splits jobs. Let $$\delta = \frac{T_d + T_c}{v} = \frac{1}{\gamma_d} + \frac{\alpha}{\gamma_c}$$

be the overhead incurred by parallel processing. When $$\delta < \frac{\lambda\mu_1}{\mu_0} \times \frac{1}{(1+\alpha)\mu_0\mu_1 + \lambda(\mu_0 + \mu_1)},$$

it is worth splitting.

When node 0 splits, it should decide how many nodes (n) are involved.

$$T_n - T_{n+1} = T_{p_n} - T_{p_{n+1}} =$$

$$\frac{\lambda^2 + (\mu_1 - \alpha\mu_0)\lambda - \alpha(1+\alpha)\mu_0\mu_1}{\left[(1+\alpha)\mu_0\mu_1 + \lambda\sum_{i=0}^{n-1} s_i\mu_i\right] \times \left[(1+\alpha)\mu_0\mu_1 + \lambda\sum_{i=0}^{n} s_i\mu_i\right]} \times s_n\mu_n v$$

If $$\lambda > \frac{\alpha\mu_0 - \mu_1 + \sqrt{(\alpha\mu_0 + \mu_1)^2 + 4\alpha^2\mu_0\mu_1}}{2},$$

executing a job on n+1 nodes will take less execution time than that on n nodes, where n≧2.

$$Speedup(n) =$$

$$\frac{T_1}{T_d + T_c + T_{p_n}} = \frac{(1+\alpha)\mu_1 + \lambda\sum_{i=0}^{n-1} s_i\mu_i}{[(1+\alpha)\delta\mu_0\mu_1 + \lambda + \mu_1 - \alpha\mu_0] + (\lambda\delta + \alpha)\sum_{i=0}^{n-1} s_i\mu_i}.$$

Intuitively, as node 0 splits the job into more pieces, the decreasing rate of overall execution time will slow down and eventually does not have significant changes, evaluated by $$Efficiency(n) = \frac{Speedup(n)}{n}.$$

$$Efficiency(n) = \frac{\frac{(1+\alpha)\mu_1}{n} + \frac{\lambda\sum_{i=0}^{n-1} s_i\mu_i}{n\mu_0}}{[(1+\alpha)\delta\mu_0\mu_1 + \lambda + \mu_1 - \alpha\mu_0] + (\lambda\delta + \alpha)\sum_{i=0}^{n-1} s_i\mu_i}.$$

According to the algorithm, node 0 adds node i to its children nodes in the sequence of $\mu_i$ decreasing. As a result, the overall execution time saved by adding one more node is becoming less significant. In other words, Efficiency(n) decreases as n increases.

Figure 13:
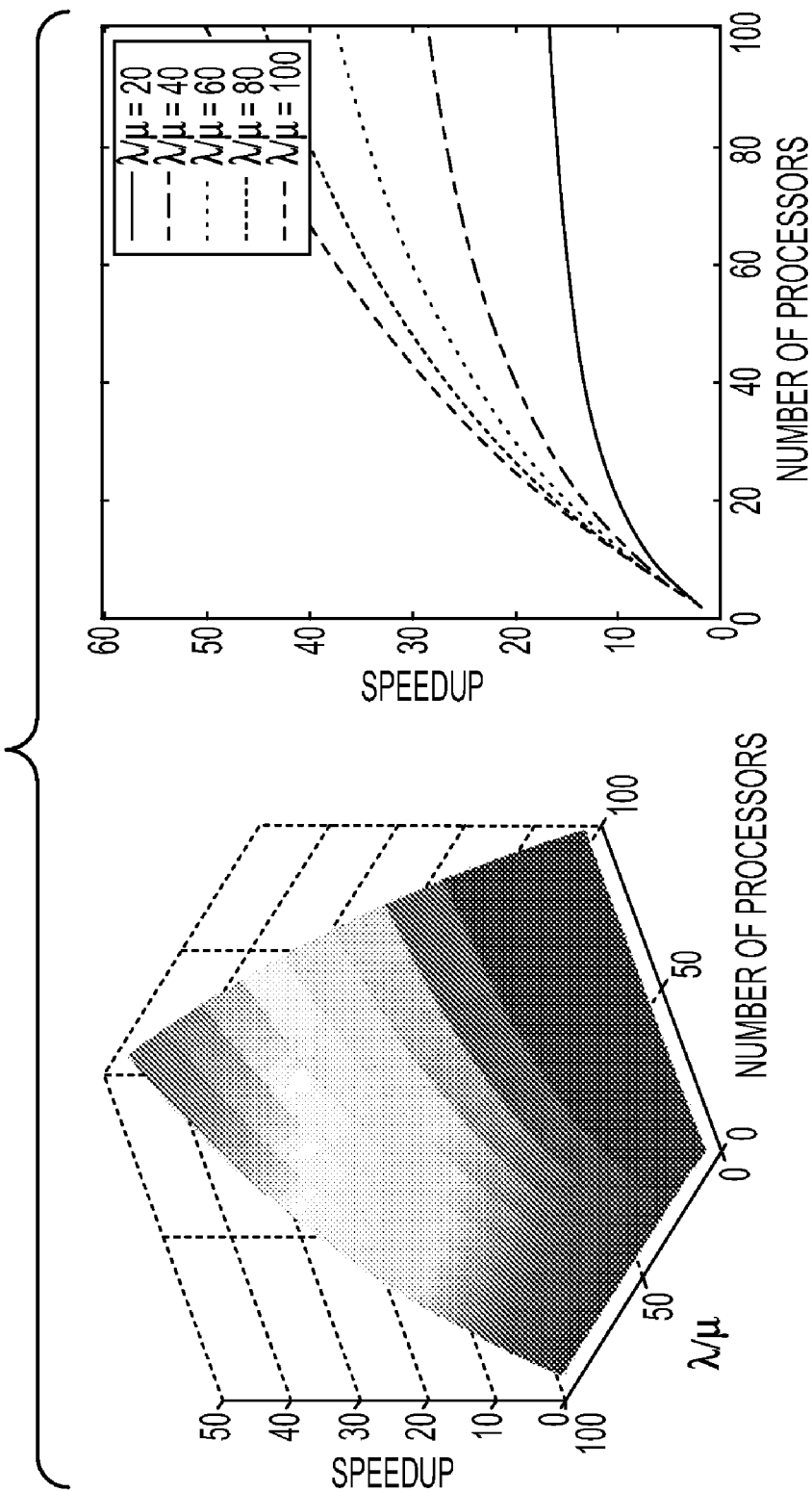
FIG. 13 graphically illustrates another Speedup(n) relationship.
Figure 14:
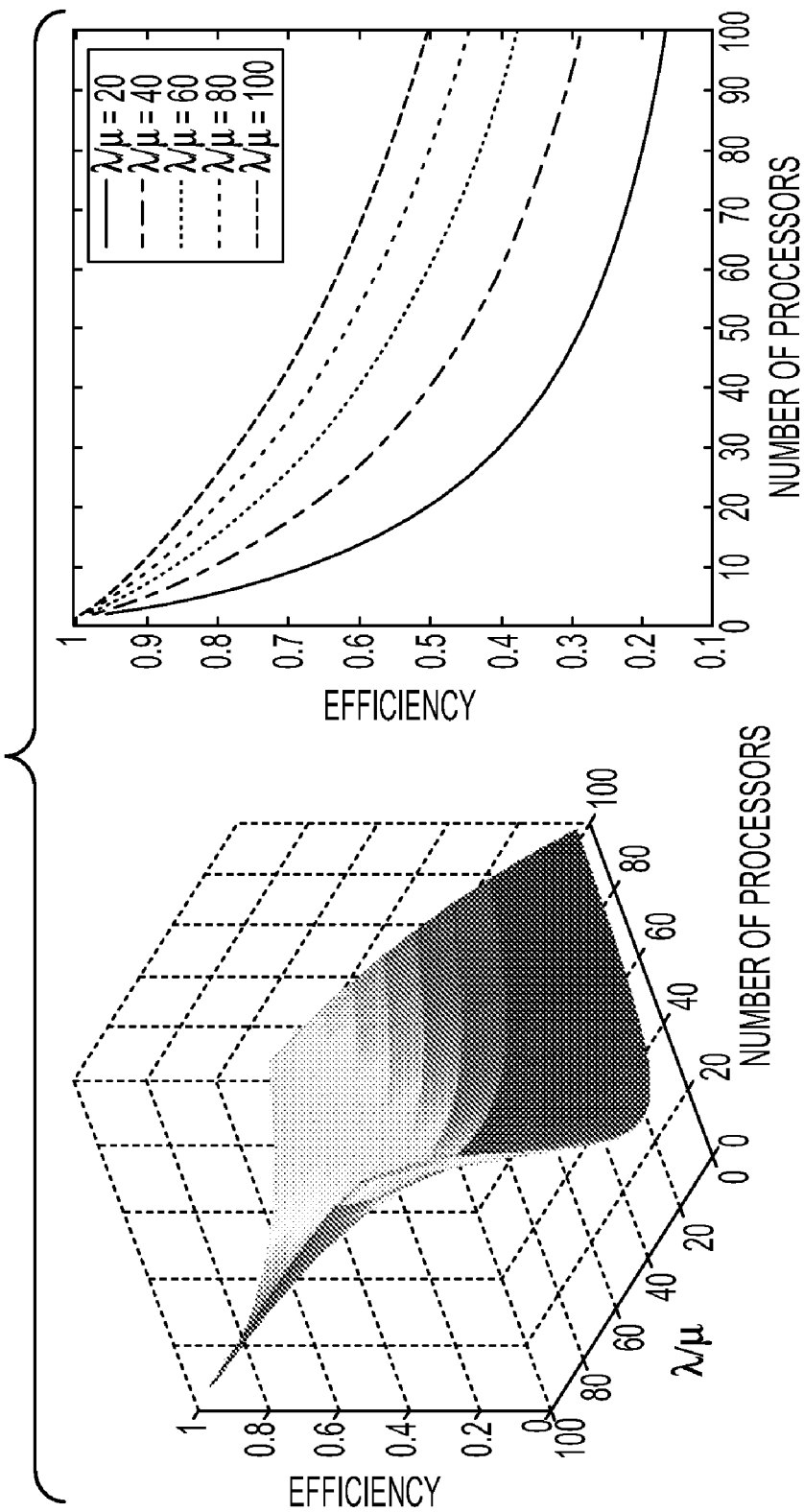
FIG. 14 graphically illustrates another Efficiency(n) relationship.

The relationship of Speedup(n) and Efficiency(n) is plotted in FIGS. 13 and 14, respectively. For simplicity, assume $\alpha=1$ (document size does not change after processing), $\mu_i=\mu$ (all the involved nodes have the same computational capability), $\delta=0$ (the time for dividing and conquering is negligible).

According to $$\lambda > \frac{\alpha\mu_0 - \mu_1 + \sqrt{(\mu_1 + \alpha\mu_0)^2 + 4\alpha^2\mu_0\mu_1}}{2},$$

$\lambda > \sqrt{2}\mu$ so that node 0 will split a job.

$$Speedup(n) = \frac{2\mu + n\lambda}{\lambda + n\mu} \text{ and } Efficiency(n) = \frac{2\mu + n\lambda}{n\lambda + n^2\mu} < 1.$$

As shown in FIG. 13, Speedup(n) increases as n increases, namely, increasing the number of nodes (processors) for parallel processing, we can speed up the overall execution time. Further, Speedup(n) increases faster with a larger $\lambda/\mu$, which means in an environment with higher communication speed, using more nodes for parallel processing can significantly decrease the overall execution time. However, the upper bound of Speedup(n) is $\lambda/\mu$.

As shown in FIG. 14, Efficiency(n) decreases as n increases. It is noted that the upper bound of Efficiency(n) is 1.

Assuming $\mu_i=\mu$ and then the termination conditions are $$Speedup(n) = \frac{(1+\alpha)\mu + \lambda\sum_{i=0}^{n-1} s_i}{[(1+\alpha)\delta\mu^2 + \lambda + \mu - \alpha\mu] + (\lambda\delta\mu + \alpha\mu)\sum_{i=0}^{n-1} s_i} > th_s \text{ and}$$

$$Efficiency(n) = \frac{\frac{(1+\alpha)\mu}{n} + \frac{\lambda\sum_{i=0}^{n-1} s_i}{n}}{[(1+\alpha)\delta\mu^2 + \lambda + \mu - \alpha\mu] + (\lambda\delta\mu + \alpha\mu)\sum_{i=0}^{n-1} s_i} > th_e.$$

As a result, the number of processors n is determined independent of workload $w_n$. Therefore, $$Scalability(m, n) = \frac{w_m}{w_n} \neq 1$$

where $w_m \neq w_n$.

Figure 2:
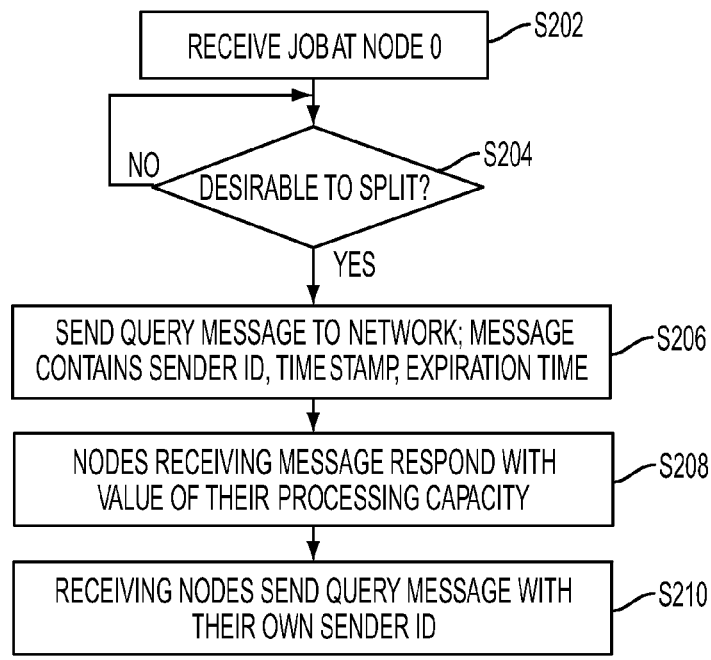
FIGS. 2 through 4 illustrate a method of distributing a computing job among a number of communicating computing devices on a network.
Figure 3:
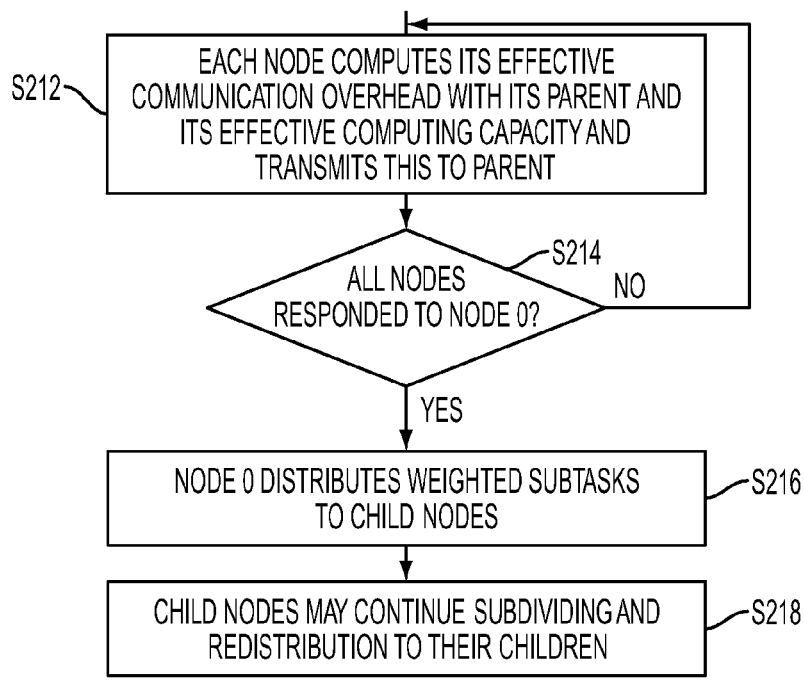
Figure 4:
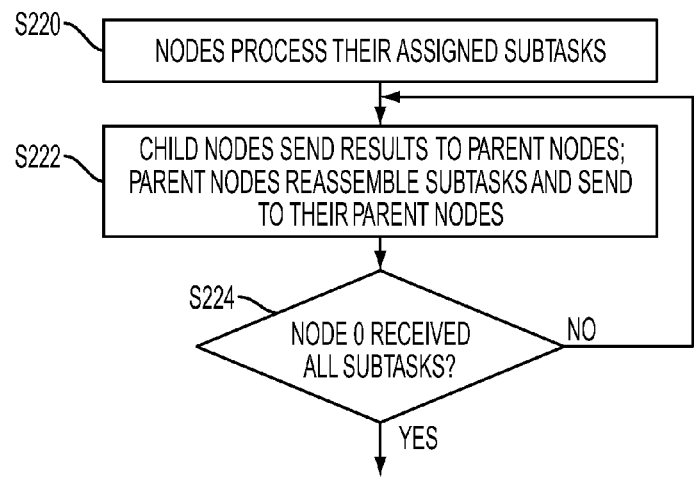

FIGS. 2 through 4 show a flow chart of how a digital reprographic machine on a network can set up an ad hoc distributed processing network to share the processing of the print job. The process consists of four phases which overlap in time.

The first phase begins in step S202 of FIG. 2 when a node, henceforth referred to as node 0, receives a job to be processed. Node 0 determines in step S204 that it would be desirable to split the job and engage extra resources on the network. This decision may be based on criteria such as the size of the job, the current workload of the node, the priority or urgency of the job or other factors. For sufficiently large jobs the overhead of establishing connections to other resources and partitioning the job may be lower than the gain in time by partitioning and sharing the processing.

In step S206, node 0 sends a broadcast message to other devices on the network. The broadcast message has the ID of the sender node, a time stamp, and an expiration time. In step S208, each node that receives the message responds to the sender, and at the same time stops responding to any other requests.

However, since there may be some nodes whose communication links to node 0 are relatively slow, each node that receives the message resends the message in step S210, substituting its own sender ID. Steps S206 through S210 are repeated recursively by all nodes on the network until the expiration time of the message. Alternatively, a node may choose to not resend the message if its estimate of the overhead of partitioning is too high.

The second phase of the process, whose start overlaps the first phase, begins in step S212 of FIG. 3. Each node computes its communication overhead with its parent node and also a measure of its effective processing capability. For nodes that have children, the effective computing capacity is a composite measure of the combined processing capacity of the node and all of its child nodes, where the composite measure includes the effects of both the communication overhead and the overhead associated with partitioning any received work. After computing these factors, the node sends this information to its parent node. The processing in step S212 continues recursively as shown in step S214 until all children have responded, and node 0 has the results from all of its direct child nodes.

In the third phase, node 0 now partitions the job into several subtasks and distributes the subtasks to its child nodes in step S216 of FIG. 3. The subtasks are not necessarily equal in size, but may be weighted to provide larger work loads to those child nodes that report larger effective processing capacity. Each node that receives a subtask now either processes it directly or further partitions it and distributes the partitioned pieces to its child nodes in step S218.

In the fourth phase, after each node finishes processing its assigned part of the work, it sends the results to its parent node in step S220 of FIG. 4. The parent node reassembles the individual subtasks from its children until it has received all of them and then returns the assembled result to its parent in turn in step S222. When all subtasks have been reassembled at node 0, the job is complete and the result is returned to the originator.

Every node knows the composite capacities of its direct child nodes and can estimate their processing times. If a node fails and stops processing, its direct parent node can discover the node failure when no result comes back from the node after the estimated completion time. Since the parent node knows all the child nodes of this failed node during phase 2, it can collect the results from these children and follow the steps in phase 1 to assign the unfinished task (which is originally assigned to the failed node) to other node(s). Node failure causes delay in job completion time, but it does not have significant impact in overall finishing time since recovery happens when other nodes process their assigned tasks or consolidate partial results.

While a parent node is partitioning and assigning tasks to its child nodes, the child nodes which have already received their tasks can immediately start processing. After the parent node finishes task assigning, it can start processing its own task. The parent node can continue processing as its child nodes finish tasks and are return results. In this way, communication time is overlapped with computation time.

The process of FIGS. 2 through 4 is dynamic in the sense that it does not require a fixed network description but is capable of utilizing any resources that are available at the time a job is processed. If a node is busy, the node may chose to not respond to any query message or may respond with an indication of reduced capability. In a similar fashion, the method of FIGS. 2 through 4 is efficient in that it takes into account the communication overhead between nodes as well as the computing capability of each node. This allows one to maximize the overall throughput of the combined computing resources.

A further feature of the method illustrated in FIGS. 2 through 4 is that not all of the nodes have to be identical, but the method will work in a homogeneous environment. For example, not all the nodes for the example of distributed PDL printing have to be digital reprographic machines, but can be any computing resource on the network. Such resources might include workstations or servers that are equipped with the appropriate software to allow the node to perform the computing task being distributed.

The decision of how far to partition any particular job may depend on several factors—the speed with which any node can partition a job into subtasks, and the cost in terms of combined communication overhead and processing speed of any child node. In general, if the speedup by adding one more subtask and child node is less than the cost in terms of time to do the partitioning and allocation, there is a net gain. It is possible, by analyzing the combined effect of a network of nodes, to compute the effective speedup. Thus the decision as to how far to partition any particular job becomes one of simple computation rather than some estimation or guesswork.

It will be appreciated that various the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of parallel processing, an electronic document to undergo disposition on a first device, in a distributed environment, the distributed environment including the first device and a plurality of distributed processors, each distributed processor being located at a node in the distributed environment, comprising:

(a) computing an overall first device processing time to process the electronic document to undergo disposition, the overall first device processing time corresponds to the time needed by the first device to process the electronic document;

(b) computing a first device disposition time to dispose of the electronic document to undergo disposition, the first device disposition time corresponds to the time needed by the first device to dispose of the electronic document;

(c) parsing the electronic document to undergo disposition into a first document and sub-documents when the overall first device processing time to process at the first device is greater than the first device disposition time;

(d) determining, at the first device, a productivity capacity of each node, the productivity capacity being a measured of the processing power of the node and the communication cost of exchanging information between the first device and the node;

(e) processing a sub-document at a node when a productivity capacity of the node will cause the processing time of the electronic document to be less than the computed overall first device processing time;

(f) aggregating a processed first document and each processed sub-document to create a processed electronic document to be disposed; and (g) disposing of the processed electronic document to undergo disposition on the first device.

2. The method as claimed in claim 1, wherein the undergoing dispositon is the rendering of the document.

3. The method as claimed in claim 1, wherein the processing of the document is the rasterization of the document.

4. The method as claimed in claim 1, wherein the undergoing disposition is the storage of the document.

5. The method as claimed in claim 1, wherein the processing of the document is the optical character recognition of the document.

6. The method as claimed in claim 1, wherein a size of a sub-document is proportional to the processing power of the node which will process the sub-document.

7. The method as claimed in claim 1, wherein the processing power of a node is the combined processing power of the node and processing power of direct children nodes connected thereto.

8. The method as claimed in claim 7, further comprising:
(h) parsing the sub-document, at the node having direct children nodes connected thereto, into a first sub-document and partial sub-documents.

9. The method as claimed in claim 8, wherein a size of a partial sub-document is proportional to the processing power of the children node which will process the partial sub-document.

10. The method as claimed in claim 8, further comprising:
(i) aggregating a processed first sub-document and each processed partial sub-document at the node having direct children nodes connected thereto, to create a processed sub-document.

11. The method as claimed in claim 8, wherein the node having direct children nodes connected thereto determines a productivity capacity of each child node, the productivity capacity being a measured of the processing power of the child node and the communication cost of exchanging information between the node having direct children nodes connected thereto and the child node, the communication cost is based upon a bandwidth between the node having direct children nodes connected thereto and a child node.

12. The method as claimed in claim 1, wherein the communication cost is based upon a bandwidth between the first device and a node.

13. A method of parallel processing, an electronic document to undergo disposition at a first node, in a distributed environment, the distributed environment including the first node and a plurality of nodes, comprising:

(a) computing a productivity capacity factor for the first node, the productivity capacity factor being a measured of the processing power of the first node;

(b) determining a nodal productivity capacity factor for each node, the nodal productivity capacity being a measured of the processing power of the node and the communication cost of exchanging information between the first node and the node;

(c) selecting a combination of nodes having an effective nodal productivity capacity factor less than the productivity capacity factor for the first node;

(d) parsing the electronic document to undergo disposition into a first sub-document and sub-documents when a combination of nodes having an effective nodal productivity capacity factor less than the productivity capacity factor for the first node, the number of sub-documents being equal to a number of nodes in the combination of nodes having an effective nodal productivity capacity factor less than the productivity capacity factor for the first node;

(e) processing the first sub-document at the first node;

(f) processing the sub-documents at the nodes forming the combination of nodes having an effective nodal productivity capacity factor less than the productivity capacity factor for the first node;

(g) aggregating a processed first document and each processes sub-document to create a processed electronic document to undergo disposition; and (h) rendering processed electronic document to undergo disposition at the first node.

14. The method as claimed in claim 13, wherein the sub-documents are processed at the nodes forming the combination of nodes having an effective nodal productivity capacity factor less than the productivity capacity factor for the first node.

15. The method as claimed in claim 13, wherein a size of a sub-document is proportional to the processing power of the node which will process the sub-document.

16. The method as claimed in claim 13, wherein the processing power of a node is the combined processing power of the node and direct children nodes connected thereto.

17. The method as claimed in claim 16, further comprising:
(i) parsing the sub-document, at the node having direct children nodes connected thereto, into a first sub-document and partial sub-documents.

18. The method as claimed in claim 17, further comprising:
(j) aggregating a processed first sub-document and each processed partial sub-document at the node having direct children nodes connected thereto, to create a processed sub-document.

19. The method as claimed in claim 17, wherein the node having direct children nodes connected thereto determines a productivity capacity of each child node, the productivity capacity being a measured of the processing power of the child node and the communication cost of exchanging information between the node having direct children nodes connected thereto and the child node, the communication cost is based upon a bandwidth between the node having direct children nodes connected thereto and a child node.

20. The method as claimed in claim 13, wherein the communication cost is based upon a bandwidth between the first node and a node.

* * * * *